J. N. FORT.
Implement for Molding and Perforating Faucet-Holes in Glass-Bottles, &c.

No. 168,149. Patented Sept. 28, 1875.

Witnesses: Inventor:
J. Shaw John Neil Fort
Thos. A. Burtt.

N. PETERS, PHOTO-LITHOGRAPHER, WASHINGTON, D. C.

UNITED STATES PATENT OFFICE.

JOHN NEIL FORT, OF PHILADELPHIA, PENNSYLVANIA, ASSIGNOR TO DEMPSEY WICKER-COVERED GLASSWARE COMPANY.

IMPROVEMENT IN IMPLEMENTS FOR MOLDING AND PERFORATING FAUCET-HOLES IN GLASS BOTTLES, &c.

Specification forming part of Letters Patent No. 168,149, dated September 28, 1875; application filed July 12, 1875.

*To all whom it may concern:*

Be it known that I, J. NEIL FORT, of Philadelphia, Pennsylvania, have invented an Implement for Molding and Perforating Faucet-Holes in Demijohns and Glass Bottles, of which implement the following is a specification:

This implement is inserted in an aperture formed at any desired point in an ordinary bottle-mold, it being employed for the purpose, first, of forming inside the glass vessel a projection and shoulder for holding a faucet; second, for removing, while the bottle is yet hot in the mold, the innermost end of said projection.

Figure 1:
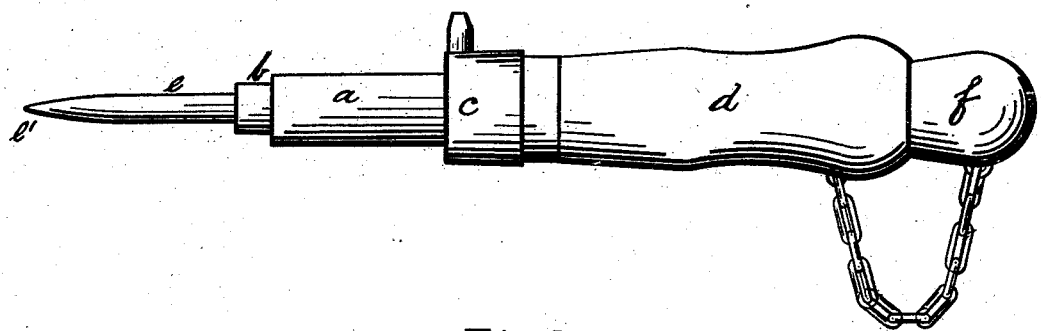
Figure 2:
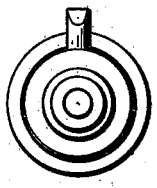
Figure 3:
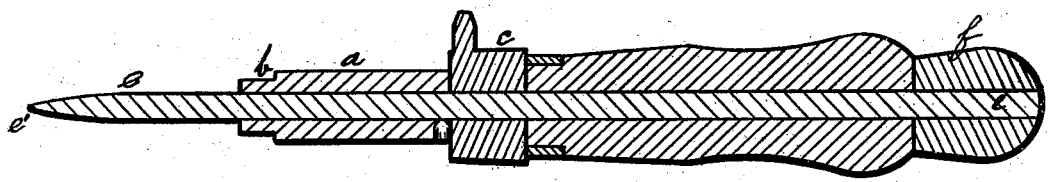

In the drawings, Figure 1 is a side elevation, Fig. 2 a front end elevation, and Fig. 3 a longitudinal section, of said implement.

$a$ is a tubular mold, with a shoulder, $b$, at its front end, and a gage, $c$, all of which may be of cast-iron in a single piece, attached to a handle of wood or metal, $d$. $e$ is a rod, preferably of steel, and preferably pointed at its front end $e'$, and provided with a head or handle, $f$. The rod $e$ is moved back and forth, as required, through the tubular mold $a$.

An aperture being formed in any ordinary glass-blower's mold, the mold $a$ is inserted in said aperture, and it forms a hollow or tubular projection of corresponding form inside any glass vessel blown in said glass-blower's mold.

When the operation of blowing has been completed a film of glass is found to close the end of the said projection, which film has to be removed while the glass vessel is still hot in the mold, and this is effected by means of the rod $e$.

The shoulder $b$ performs two functions. It serves to produce on the projection above referred to a corresponding shoulder, which forms an abutment for a tubular cork inserted as a packing or cushion for the faucet, and in case said shoulder should crack, as sometimes occurs when the end is broken off by the rod $e$, the shoulder may be broken off or filed down, and the demijohn is thus saved for use.

I claim—

The implement consisting of the tubular mold $a$, gage $c$, and rod or plunger $e$, constructed and operating in the manner and for the purpose substantially as set forth.

JOHN NEIL FORT.

Witnesses:
 JNO. A. BELL,
 THOS. A. BURTT.